United States Patent
Kim

(10) Patent No.: US 9,582,129 B2
(45) Date of Patent: Feb. 28, 2017

(54) TOUCH SCREEN PANEL

(71) Applicant: Samsung Display Co., Ltd., Yongin, Gyeonggi-Do (KR)

(72) Inventor: Tae-Ik Kim, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 51 days.

(21) Appl. No.: 14/593,891

(22) Filed: Jan. 9, 2015

(65) Prior Publication Data

US 2015/0205407 A1    Jul. 23, 2015

(30) Foreign Application Priority Data

Jan. 22, 2014   (KR) .................. 10-2014-0007811

(51) Int. Cl.
G06F 3/044    (2006.01)

(52) U.S. Cl.
CPC .... *G06F 3/044* (2013.01); *G06F 2203/04107* (2013.01); *G06F 2203/04111* (2013.01)

(58) Field of Classification Search
CPC .......... G06F 3/044; G06F 2203/04111; G06F 2203/04107
USPC ....................................... 345/174
See application file for complete search history.

(56) References Cited

U.S. PATENT DOCUMENTS

| | | | |
|---|---|---|---|
| 8,420,970 B2 | 4/2013 | Chang et al. | |
| 8,558,805 B2 | 10/2013 | Lee et al. | |
| 2008/0188241 A1 | 8/2008 | Mo et al. | |
| 2011/0248938 A1 | 10/2011 | Kwak et al. | |
| 2012/0105343 A1* | 5/2012 | Lee .................. | G06F 3/044 345/173 |
| 2012/0182230 A1 | 7/2012 | Wang et al. | |
| 2013/0154979 A1 | 6/2013 | Li et al. | |
| 2013/0279063 A1 | 10/2013 | Yoo et al. | |
| 2013/0285939 A1* | 10/2013 | Kim .................. | G06F 3/041 345/173 |
| 2014/0098304 A1* | 4/2014 | Kim .................. | G06F 3/044 349/12 |

FOREIGN PATENT DOCUMENTS

KR    10-2013-0107682    10/2013

\* cited by examiner

*Primary Examiner* — Andrew Sasinowski
*Assistant Examiner* — Chineyere Wills-Burns
(74) *Attorney, Agent, or Firm* — Innovation Counsel LLP

(57) ABSTRACT

A touch screen panel may include a first sensing electrode that has a recess. The touch screen panel may further include a second sensing electrode that immediately neighbors the first sensing electrode. The touch screen panel may further include a dummy member that is disposed in the recess and is electrically insulated from the first sensing electrode. The touch screen panel may further include a static electricity induction member that is electrically connected to the second sensing electrode. A portion of the static electricity induction member may overlap the dummy member and may be electrically insulated from the dummy member.

20 Claims, 4 Drawing Sheets

TOUCH SCREEN PANEL

RELATED APPLICATION(S)

This application claims priority to and the benefit of Korean Patent Application No. 10-2014-0007811, filed on Jan. 22, 2014, in the Korean Intellectual Property Office, the entire contents of which are incorporated herein by reference in their entirety.

BACKGROUND

1. Field

An aspect of the present invention relates to a touch screen panel.

2. Description of the Related Art

A touch screen panel is an input device that may allow a user to input an instruction by selecting an instruction content displayed on a screen of a display device with a hand or object.

Touch screen panels may include resistive overlay touch screen panels, photosensitive touch screen panels, capacitive touch screen panels, and so on. A capacitive touch screen panel may sense a contact by sensing a change in capacitance formed between a conductive sensing electrode and an adjacent sensing electrode or ground electrode when a hand or object comes in contact with the touch screen panel. In order to accurately decide the contact position on the contact surface, a capacitive touch screen panel may be configured to include first-type sensing electrodes connected along a first direction by first-type connection patterns and to include second-type sensing electrodes connected along a second direction by second-second connection patterns.

The touch screen panel may include static electricity induction patterns for inducing static electricity so as to prevent damage caused by static electricity. For example, an end portion of a static electricity induction pattern may be electrically coupled to a first-type sensing electrode, and another end portion of the static electricity induction pattern may extend toward a second-type sensing electrode. The static electricity induction pattern and the second-type sensing electrode should be electrically insulated from each other.

SUMMARY

An embodiment of the present invention may be related to a touch screen panel. The touch screen panel may include a first sensing electrode that has a recess. The touch screen panel may further include a second sensing electrode that immediately neighbors the first sensing electrode. The touch screen panel may further include a dummy member that is disposed in the recess and is electrically insulated from the first sensing electrode. The touch screen panel may further include a static electricity induction member that is electrically connected to the second sensing electrode. A portion of the static electricity induction member may overlap the dummy member in a direction perpendicular to a touch surface of the touch screen panel and may be electrically insulated from the dummy member.

The dummy member may be formed of a same material in a same layer as the first sensing electrode and/or the second sensing electrode.

The static electricity induction member may extend from the second sensing electrode to the dummy member in an extending direction. A width of the dummy member in a width direction different from (e.g., perpendicular to) the extending direction may be greater than a width of the static electricity induction member in the width direction.

The touch screen panel may include an insulating layer disposed between the portion of the static electricity induction member and the dummy member in the direction perpendicular to a touch surface of the screen panel. A width of the insulating layer in the width direction may be greater than the width of the static electricity induction member in the width direction, for providing sufficient insulation. The width of the insulating layer in the width direction may be less than the width of the dummy member in the width direction, for conserving insulating material.

A first portion of the insulating layer may be disposed between the second sensing electrode and the dummy member in a direction parallel to the touch surface of the touch screen panel.

A second of the insulating layer may be disposed between the second sensing electrode and the static electricity induction member in the direction perpendicular to the touch surface of the touch screen panel.

The touch screen panel may include a protection layer overlapping one or more of the first sensing electrode, the second sensing electrode, the dummy member, the static electricity induction member, and the insulating layer in the direction perpendicular to the touch surface of the touch screen panel. The dummy member may be disposed between the first portion of the insulating layer and a portion of the protection layer in the direction parallel to the touch surface of the touch screen panel.

A third portion of the insulating layer may be disposed between the dummy member and the protection layer.

The portion of protection layer may be disposed between the dummy member and the first sensing electrode.

An edge of the dummy pattern may be flush with at least one of a first edge of the first sensing electrode and a second edge of the first sensing electrode. The edge of the dummy pattern may be positioned between the first edge of the first sensing electrode and the second edge of the first sensing electrode.

The touch screen panel may include a first connection member. The touch screen panel may further include a third sensing electrode that overlaps the first connection member in the direction perpendicular to a touch surface of the touch screen panel and is electrically connected to the first sensing electrode through the first connection member.

The touch screen panel may include an insulating layer that overlaps the first sensing electrode and has a contact hole structure (which may include one or more contact holes). The first connection member may be electrically connected to the first sensing electrode through the contact hole structure.

The static electricity induction member may be formed of a same material in a same layer as the first connection member.

The touch screen panel may include a second connection member. The touch screen panel may further include a fourth sensing electrode that is electrically connected to the second sensing electrode through the second connection member. The first sensing electrode, the second sensing electrode, and the second connection member may be formed of a transparent electrode material. The first connection member and the static electricity induction member may be formed of an opaque metal material.

The second connection member may be disposed between the first sensing electrode and the third sensing electrode.

The first sensing electrode and the second sensing electrode may be disposed in a same layer. A portion of the second sensing electrode may be disposed between the first sensing electrode and the third sensing electrode. A portion of the first sensing electrode may be disposed between the second sensing electrode and the fourth sensing electrode.

The touch screen panel may include a second dummy member that is disposed in a recess of the third sensing electrode and is electrically insulated from the third sensing electrode. The touch screen panel may further include a second static electricity induction member electrically connected to the second sensing electrode. A portion of the second static electricity induction member may overlap the second dummy member in the direction perpendicular to the touch surface of the touch screen panel and may be electrically insulated from the second dummy member.

The touch screen panel may include a first conductive line that is disposed in a sensing-electrode-free area (or touch non-active area) that has no sensing electrodes, is disposed between a first edge of the touch screen panel and the first sensing electrode in a plan view of the touch screen panel, and is electrically connected to the first sensing electrode. The touch screen panel may further include a second conductive line that is disposed in the sensing-electrode-free area, disposed between a second edge of the touch screen panel and the second sensing electrode in the plan view of the touch screen panel, and is electrically connected to the second sensing electrode. The first edge of the touch screen panel may be substantially perpendicular to the second edge of the touch screen panel. The conductive lines may electrically connect the sensing electrodes to one or more driving/controlling circuits.

The touch screen panel may include a substrate that overlaps (and supports) each of the first sensing electrode and the second sensing electrode. The substrate may be formed of one or more of polyethylene terephthalate (PET), polycarbonate (PC), acryl, polymethyl methacrylate (PMMA), triacetyl cellulose (TAC), polyether sulfone (PES), and polyimide (PI).

An embodiment of the present invention may be related to a touch screen panel that may include the following elements: a substrate; a plurality of first-type sensing electrodes (or first sensing electrodes, for conciseness) formed to be connected along a first direction on the substrate; a plurality of second-type sensing electrodes (or second sensing electrodes, for conciseness) with portions being disposed between the first sensing electrodes, the second sensing electrodes being formed to be connected along a second direction intersecting the first direction; a plurality of first connection members/patterns formed to connect the first sensing electrodes along the first direction, and a plurality of second connection members/patterns formed to connect the second sensing electrodes along the second direction; a plurality of static electricity induction members/patterns each having a first end portion electrically connected to at least one of the first and second sensing electrodes, a "connected" sensing electrode, and having a second end portion extending in the direction toward an adjacent sensing electrode, a "receiving" sensing electrode, from the connected sensing electrode (to which the static electricity induction pattern is electrically connected); a plurality of dummy members/patterns formed in the shape of an island in at least one partial area or recess of the receiving sensing electrode, the plurality of dummy patterns being electrically insulated from the receiving sensing electrode, the plurality of dummy patterns overlapping the second end portion of the static electricity induction pattern; and an insulating layer positioned between the static electricity induction patterns and the dummy patterns.

The dummy patterns may be formed of the same material in the same layer as the first and second sensing electrodes. The width of a dummy pattern in a width direction intersecting the length direction of a static electricity induction pattern may be greater than the width of the static electricity induction pattern in the width direction. The dummy patterns may be flush with an edge of the receiving sensing electrode.

The first connection patterns may be separated from the first sensing electrodes, may connect each line (e.g., row) of the first sensing electrodes along the first direction, and may be electrically connected to the first sensing electrodes in layer above or below the first sensing electrodes. The first connection patterns may be electrically connected to the first sensing electrodes through a contact hole formed in the insulating layer.

The static electricity induction patterns may be formed of the same material in the same layer as the first connection patterns. The first and second sensing electrodes and the second connection patterns may be formed of a transparent electrode material, and the first connection patterns and the static electricity induction patterns may be formed of an opaque metal material. The first and second sensing electrodes may be disposed in the same layer.

The touch screen panel may further include outer lines (or conductive lines) formed to connect lines (e.g., rows and columns) of the first and second sensing electrodes to an external driving circuit along the respective first and second directions. The substrate may be a thin film substrate formed of one or more of polyethylene terephthalate (PET), polycarbonate (PC), acryl, polymethyl methacrylate (PMMA), triacetyl cellulose (TAC), polyether sulfone (PES) and polyimide (PI).

DETAILED DESCRIPTION

Figure 1:
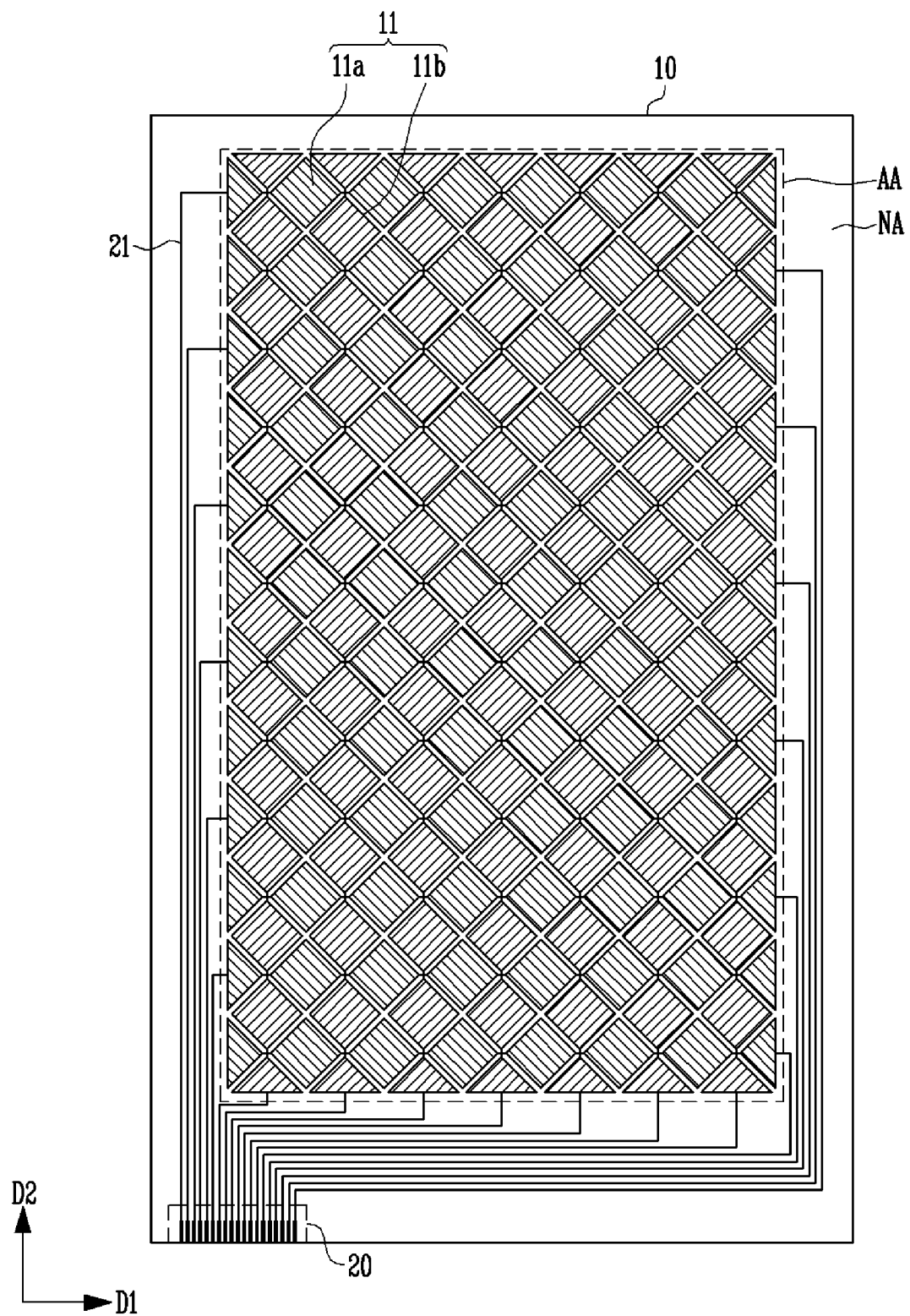
FIG. 1 is a plan view schematically illustrating a touch screen panel according to an embodiment of the present invention.

In the following detailed description, example embodiments of the present invention are described with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In this application, when a first element is referred to as being "on" a second element, the first element can be directly on the second element or can be indirectly on the second element with one or more intervening elements interposed therebetween. When a first element is referred to as being "connected to" a second element, the first element can be directly connected to the second element or can be indirectly connected to the second element with one or more intervening elements interposed therebetween.

In this application, like reference numerals may refer to like elements. The term "connect" may mean "electrically connect". The term "insulate" may mean "electrically insulate".

FIG. 1 is a plan view schematically illustrating a touch screen panel according to an embodiment of the present invention.

Referring to FIG. 1, the touch screen panel includes a substrate 10, sensing electrodes 11 formed in a touch active area AA on the substrate 10, and outer lines 21 formed in a touch non-active area NA at the periphery of the touch active area AA to connect the sensing electrodes 11 to an external driving circuit (not shown) through a pad portion 20.

The substrate 10 is made of a material having substantial flexibility, substantial transparency, substantial thermal resistance, and substantial chemical resistance. For example, the substrate 10 may be a thin film substrate formed of one or more of polyethylene terephthalate (PET), polycarbonate (PC), acryl, polymethyl methacrylate (PMMA), triacetyl cellulose (TAC), polyether sulfone (PES), and polyimide (PI).

The touch active area AA may overlap an image display area of a display panel (not shown) disposed below the touch screen panel and may be visible to a viewer. The touch non-active area (NA) may overlap a non-display area of the display panel and may be covered by a frame configured for covering the non-display area or may be covered a light shielding layer configured for shielding light.

The sensing electrodes 11 are distributed and arranged in the touch active area AA on the substrate 10. The sensing electrodes 11 may include a plurality of first-type sensing electrodes 11a (or first sensing electrodes 11a, for conciseness) electrically connected along a first direction D1. The sensing electrodes 11 may further include a plurality of second-type sensing electrodes 11b (or second sensing electrodes 11b, for conciseness) distributed and arranged between the first sensing electrodes 11a. The second sensing electrodes 11b may not overlap the first sensing electrodes 11a in a direction perpendicular to a touch surface of the touch screen panel. The second sensing electrodes 11b may be electrically connected along a second direction D2 different from (e.g., perpendicular to) the first direction D1.

First sensing electrodes 11a and second sensing electrodes 11b may be alternately arranged along a third direction different from each of the first direction D1 and the second direction D2. First sensing electrodes 11a may be connected along a row direction (horizontal direction), and rows of first sensing electrodes 11a may be respectively electrically connected to outer lines 21 of a first set of the outer lines 21 (illustrated at the left portion and the right portion of the non-active area NA). Second sensing electrodes 11b may be connected along a column direction (vertical direction), and columns of second sensing electrodes 11b may be respectively electrically connected to outer lines 21 of a second set of the outer lines 21 (illustrated at a lower portion of the non-active area NA).

The first sensing electrodes 11a and the second sensing electrodes 11b may be formed of a transparent electrode material, such as indium tin oxide (ITO), so that light from the display panel (not shown) disposed below the touch screen panel can be transmitted therethrough.

First-type connection patterns (or first connection patterns, for conciseness) are arranged along the first direction D1 in the touch active area AA to connect the first sensing electrodes 11a in the first direction D1. Second-type connection patterns (or second connection patterns, for conciseness) are arranged along the second direction D2 n the touch active area AA to connect the second sensing electrodes 11b in the second direction D2.

The outer lines 21 are used to connect the lines of the first sensing electrodes 11a and the second sensing electrodes 11b along the respective first and second directions D1 and D2 to the external driving circuit (not shown). For example, a first set and a second set of the outer lines 21 are respectively electrically connected to the row lines of the first sensing electrodes 11a and the column lines of the second sensing electrodes 11b, to connect the first and second sensing electrodes 11a and 11b to the external driving circuit, such as a position detecting circuit, through the pad portion 20.

The outer lines 21 are disposed in the touch non-active area NA at an outer portion of the touch screen panel while avoiding the touch active area AA, in which an image is displayed. The outer lines 21 may be formed of a transparent electrode material used to form the sensing electrodes 11, for optimizing manufacturing efficiency. The outer line may be formed of a low-resistance metallic material, such as one or more of molybdenum (Mo), silver (Ag), titanium (Ti), copper (Cu), aluminum (Al), and a Mo—Al—Mo combination, for minimizing heat generation and/or optimizing signal transmission.

The touch screen panel may be a capacitive touch screen panel. If a contact object, such as a user's finger or stylus pen, contacts the touch screen panel, detection of a change in capacitance at a contact position may be transferred from the sensing electrode 11 associated with the contact position to the driving circuit via the corresponding outer line 21 and the pad portion 20. The change in capacitance may be converted into an electrical signal by X and Y input processing circuits (not shown), such that the contact position may be determined.

Figure 2A:
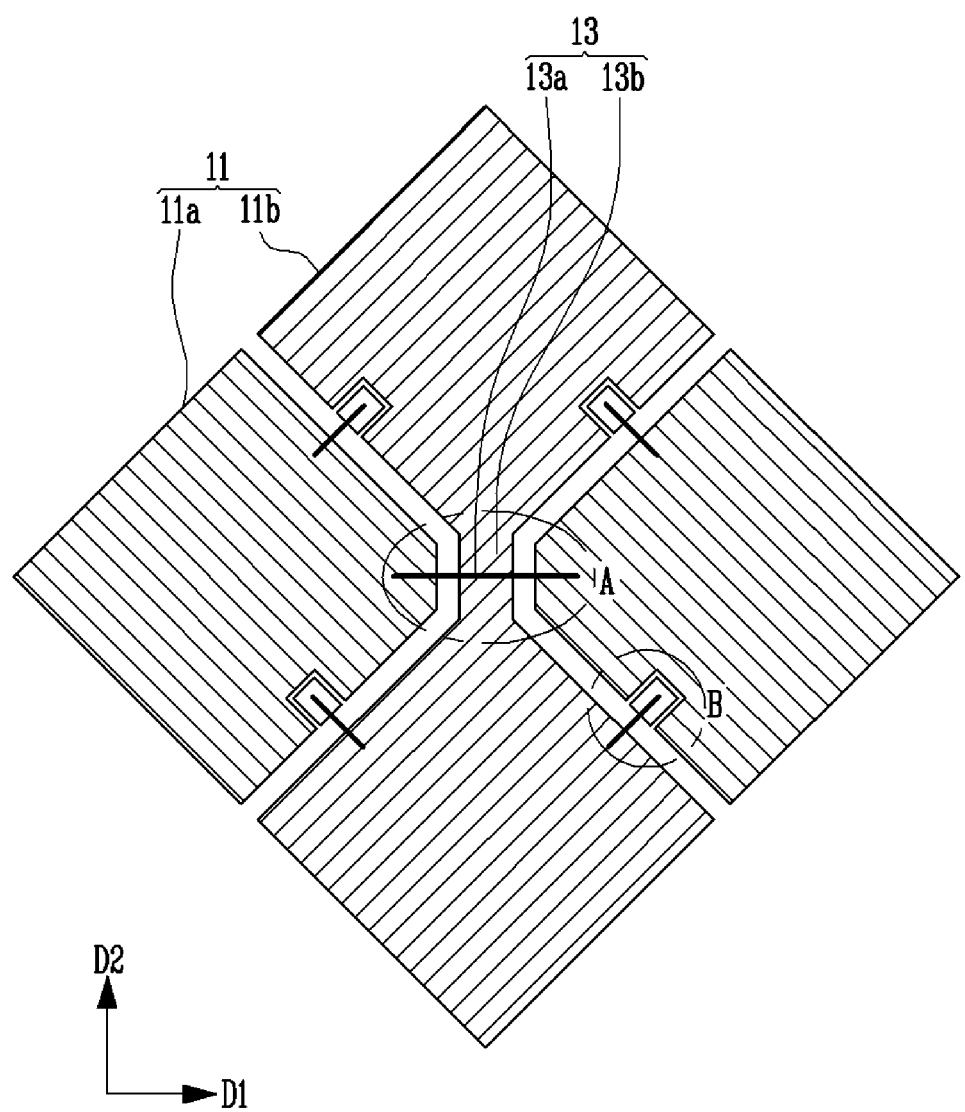
FIG. 2A is a view schematically illustrating a portion of the touch screen panel illustrated in FIG. 1.
Figure 2B:
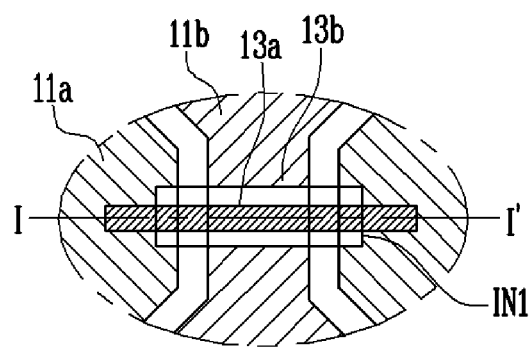
FIGS. 2B and 2C illustrate portions of FIG. 2A.
Figure 2C:
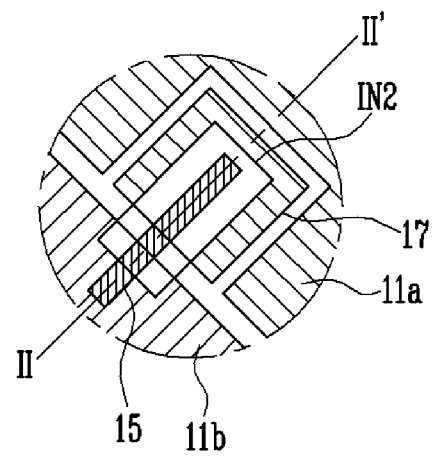
Figure 3A:
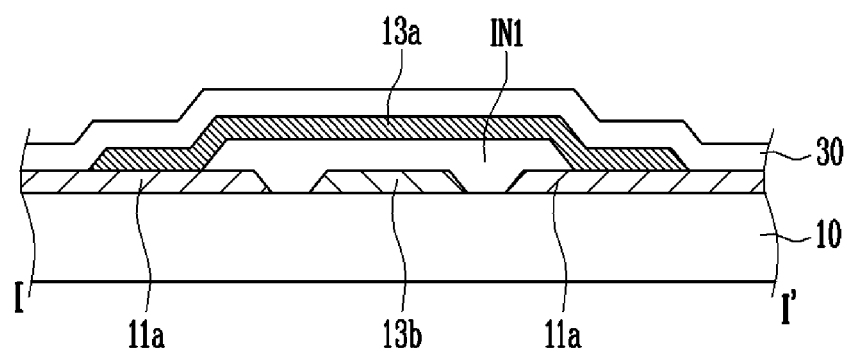
FIGS. 3A and 3B are cross-sectional views taken along lines I-I' and II-II' indicated in FIG. 2B and FIG. 2C.
Figure 3B:
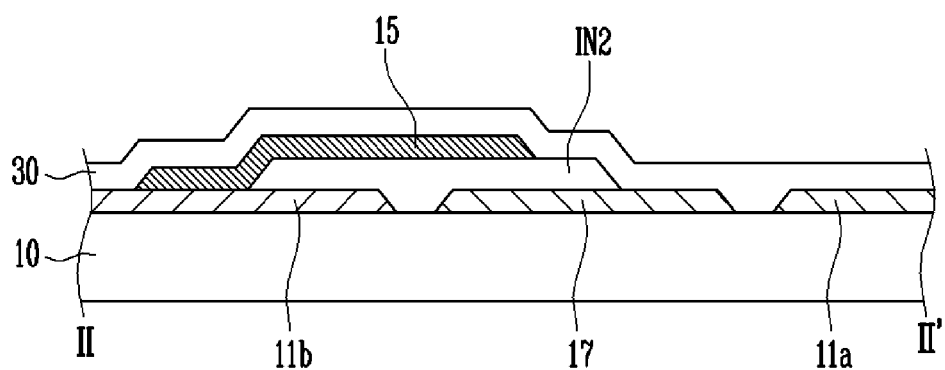

FIG. 2 is a view schematically illustrating a portion of the touch screen panel illustrated in FIG. 1. FIGS. 2B and 2C illustrate portions of FIG. 2A. FIGS. 3A and 3B are cross-sectional views taken along lines I-I' and II-IP indicated in FIG. 2B and FIG. 2C.

A structure that includes two adjacent first sensing electrodes 11a and two adjacent second sensing electrodes 11b are illustrated in FIG. 2A. The touch screen panel illustrated in FIG. 1 may have a structure in which the structure illustrated in FIG. 2A is repeated on the substrate 10.

Referring to portion A of FIG. 2A illustrated in FIG. 2B and FIG. 3A, the touch screen panel may include a substrate 10; a plurality of first sensing electrodes 11a electrically connected along a first direction D1 in a touch active area AA on a substrate 10; a plurality of second sensing electrodes 11b electrically connected along a second direction D2 in the touch active area AA on the substrate 10; a plurality of first-type connection patterns/members 13a (or first connection patterns 13a, for conciseness) formed to electrically connect the first sensing electrodes 11a along the first direction D1; a plurality of second-type connection patterns/members 13b (or second connection patterns 13b) formed to electrically connect the second sensing electrodes 11b along the second direction D2; and a first insulating layer IN1 interposed between the first connection patterns 13a and the second connection patterns 13b to provide electrical insulation.

In some embodiments, the first insulating layer IN1 may be disposed between the first connection patterns 13a and the second connection patterns 13b without overlapping the sensing electrodes 11 in a direction perpendicular to a touch surface of the touch screen panel. In some embodiments, the first insulating layer IN1 may overlap the sensing electrodes 11 in the direction perpendicular to the touch surface of the touch screen panel. The touch screen panel may include a protection layer 30 that is formed at an upper portion of the touch screen panel to protect the patterns/members formed on the substrate 10. The protection layer 30 is formed a same material as the first insulating layer IN1.

Elements in the touch active area AA may be transparent so that an image displayed by the display panel can be visible. The sensing electrodes 11a and 11b may be formed of a transparent electrode material, such as ITO. The first connection patterns 13a and/or the second connection patterns 13b may be formed of the same transparent electrode material as the sensing electrodes 11a and 11b and/or may be formed of an opaque low-resistance metal material. In an embodiment, the connection patterns 13a and/or 13b may be formed of an opaque material, and the width, thickness, and/or length of the first connection patterns 13a and/or the second connection patterns 13b may be configured so that the connection patterns 13a and/or 13b may be inconspicuous and/or substantially invisible to a viewer.

In an embodiment, the first connection patterns 13a may be formed of an opaque low-resistance metal material, and the second connection patterns 13b may be formed, together with the sensing electrodes 11a and 11b, of a transparent electrode material. In this case, first sensing electrodes 11a in each line (e.g., row) may be separated from each other and may be connected along the first direction D1 by the first connection patterns 13a. A second connection pattern 13b may directly contact the substrate 10 and may be disposed between two immediately neighboring first sensing electrodes 11a.

In some embodiments, the first insulating layer Ni may include insulating members locally formed at intersections of the connection patterns 13a and 13b, and the first sensing electrodes 11a and the first connection patterns 13a may be connected through direct contact. In this case, the contact resistance between the first sensing electrodes 11a and the first connection patterns 13a may be determined according to the size of a contact area between the first sensing electrodes 11a and the first connection patterns 13a.

In some embodiments, each of two end portions of a first connection pattern 13 may be electrically connected to one of two immediately adjacent first sensing electrodes 11a through a contact hole structure (not shown) formed in the first insulating layer IN1. The contact hole structure may include one or more contact holes, and the contact hole structure may include two or more contact holes to decrease the contact resistance. The number of contact holes may be controlled in consideration of contact resistance, visibility, etc.

The second connection patterns 13b may be formed of a transparent electrode material, and the second sensing electrodes 11b and the second connection patterns 13b may be integrally patterned for each line (e.g., column) of second sensing electrodes 11b along the second direction D2 from a patterning process of the transparent electrode material, such that the efficiency of the manufacturing process may be optimized.

Referring to FIG. 2B, FIG. 2C, FIG. 3A, and FIG. 3B, in some embodiments, the first connection patterns 13a may be formed of an opaque low-resistance metal material, and the first connection patterns 13, and static electricity induction patterns 15, and the outer lines 21 may be simultaneously formed in a same process, such that the efficiency of the manufacturing process may be optimized. That is, the first connection patterns 13a may be formed of the same material in the same layer as the static electricity induction patterns 15 and the outer lines 21.

In some embodiments, the first connection patterns 13a may be formed of an opaque low-resistance metal material, and the width of the first connection patterns 13a may be configured such that the first connection patterns 13a may be inconspicuous or substantially invisible to a viewer. Thus, the width of the first connection patterns 13a may be substantially narrower than that of the second connection patterns 13b formed of the transparent electrode material. In some embodiments, the first connection patterns 13a may extend in a substantially oblique or diagonal direction that is inclined with respect to each of the first direction D1 and the second direction D2, so that the first connection patterns 13a may be inconspicuous or substantially invisible to a viewer.

Referring to portion B of FIG. 2A illustrated in FIG. 2C and FIG. 3B, the touch screen panel includes a plurality of static electricity induction patterns/members 15 each having a first end portion electrically connected to at least one of the first and second sensing electrodes 11a and 11b and having a second end portion extending in the direction toward an adjacent sensing electrode from the sensing electrode to which the static electricity induction pattern 15 is connected, the second end portion being disposed between two portions of the adjacent sensing electrode; a plurality of dummy patterns/members 17 formed in the shape of an island in at least one partial area of the first and second sensing electrodes 11a and 11b, the plurality of dummy patterns 17 electrically insulated from the sensing electrodes, each dummy pattern 17 overlapping with a second end portions of a static electricity induction pattern 15; and a second insulating layer IN2 positioned between the static electricity induction patterns 15 and the dummy patterns 17. A first dummy pattern 17 may be disposed between two portions of a first sensing electrode 11a and disposed between the first sensing electrode 11a and a second sensing electrode 11b that immediately neighbors the first sensing electrode 11a; the first dummy pattern 17 may be surrounded by the second sensing electrode 11b and three portions of the first sensing electrode 11a. A second dummy pattern 17 may be disposed between two portions of a second sensing electrode 11b and disposed between the second sensing electrode 11b and a first sensing electrode 11a that immediately neighbors the second sensing electrode 11b; the second dummy pattern 17 may be surrounded by the first sensing electrode 11a and three portions of the second sensing electrode 11b.

In the related art, when electrical energy of static electricity flows into a static electricity induction pattern overlapping a sensing electrode and insulated from the sensing electrode by an insulating layer, the insulating layer may be broken; therefore, a short circuit may occur between the static electricity induction pattern and the sensing electrode. In contrast, embodiments of the present invention may prevent such short circuit between a static electricity induction pattern and a sensing electrode. Referring to portion B of FIG. 2A illustrated in FIG. 2C and FIG. 3B, a static electricity induction pattern 15 overlaps a dummy pattern 17, which is electrically insulated from sensing electrodes, without overlapping the receiving sensing electrode that receives the dummy pattern 17 and is insulated from the dummy pattern 17 by the insulating layer IN1. Therefore, even if the insulating IN2 is broken, the static electricity induction pattern 15 may still be insulated from the receiving sensing electrode by the insulating IN1.

A static electricity induction pattern 15 may be electrically connected to a first sensing electrode 11a or a second sensing electrode 11b and may extend in the direction toward a sensing electrode adjacent to the sensing electrode to which the static electricity induction pattern 15 is electrically connected. For example, a first static electricity induction pattern 15 may have a first end portion electrically connected to a connected first sensing electrode 11a and may have a second end portion extending in the direction toward a neighboring second sensing electrode 11b that immediately neighbors the connected first sensing electrode 11a, and the first static electricity induction pattern 15 may be insulated from the neighboring second sensing electrode 11b by both the second insulating layer IN2 and the first insulating layer IN1. A second static electricity induction pattern 15 may have a first end portion electrically connected to a connected second sensing electrode 11b and may have a second end portion extending in the direction toward a neighboring first sensing electrode 11a that immediately neighbors the connected second sensing electrode 11b, and the second static electricity induction pattern 15 may be insulated from the neighboring first sensing electrodes 11a by both the second insulating layer IN2 and the first insulating layer IN1.

A plurality of static electricity induction patterns 15 may be formed at or electrically connected to one sensing electrode. For example, two static electricity induction patterns 15 may be disposed in the same size at positions symmetric to each other on two sides of a sensing electrode 11a or 11b.

The static electricity induction patterns 15 may be formed of the same material in the same layer as the first connection pattern 13a, for the purpose of process simplification. For example, like the first connection patterns 13a and the outer lines 21, the static electricity induction patterns 15 may be formed of an opaque low-resistance metal material.

In some embodiments, end portions of the static electricity induction patterns 15 and sensing electrodes may be connected through direct contact. In this case, the contact resistance may be determined according to the size of a contact area between the end portions of the static electricity induction patterns 15 and the sensing electrodes.

In some embodiments, the static electricity induction patterns 15 are patterned to be separated from sensing electrodes in an upper or lower layer of the sensing electrode to which the static electricity induction patterns 15 are electrically connected, and end portions of the static electricity induction patterns 15 may be electrically connected to the sensing electrodes through a contact hole formed in the second insulating layer IN2.

A dummy pattern 17 may be formed in the shape of an island and may be received in a recess of a receiving sensing electrode that is insulated from the static electricity induction patterns 15 that overlaps the dummy pattern 17. The dummy pattern 17 may be spaced apart from the receiving sensing electrode by a predetermined interval, to be electrically insulated from the receiving sensing electrode. The dummy pattern 17 may overlap an end portion of the static electricity induction pattern 15. The second insulating layer IN2 may insulate the static electricity induction pattern 15 and the dummy pattern 17 from each other.

An edge of a dummy pattern 17 may be flush with an edge of the receiving first sensing electrode 11a that receives the dummy pattern 17. A static electricity induction pattern 15 may extend in an extending direction from a connected second sensing electrode 11b (which is electrically connected to the static electricity induction pattern 15) to the receiving first sensing electrode 11a. The width of (e.g., the edge of) the dummy pattern 17 in a width direction intersecting the extending direction of the static electricity induction pattern 15 may be greater than a width of the static electricity induction pattern 15 in the width direction. The dummy pattern 17 may entirely cover an end portion of the static electricity induction patterns 15 so that the end portion of the static electricity induction patterns 15 may not overlap the first sensing electrodes 11a.

The dummy patterns 17 may be formed of the same material in the same layer as the sensing electrodes 11a and 11b. For example, the dummy patterns 17 may be patterned together with the sensing electrodes 11a and 11b, using the same transparent material as the sensing electrodes 11a and 11b. The dummy patterns 17 may have one or more of various shapes. In some embodiments, the dummy patterns 17 may have a quadrangular shape.

According to embodiments of the present invention, the dummy patterns may be electrically insulated from the sensing electrode and may overlap end portions of static electricity induction patterns. Even if the insulation state between a static electricity induction pattern and a dummy pattern is broken by static electricity, short circuit between the static electricity induction pattern and a sensing electrode can be prevented.

Example embodiments have been disclosed herein. Although specific terms are employed, they are used and are to be interpreted in a generic and descriptive sense and are not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. It will be understood by those of skill in the art that various changes in form and details may be made without departing from the spirit and scope of the present invention as set forth in the following claims.

What is claimed is:

1. A touch screen panel comprising:
   a first sensing electrode;
   a second sensing electrode immediately neighboring the first sensing electrode;
   a dummy member electrically insulated from the first sensing electrode and the second sensing electrode; and
   a static electricity induction member electrically connected to the second sensing electrode, a portion of the static electricity induction member overlapping the dummy member, being electrically insulated from the dummy member, and being not electrically connected to the dummy member.

2. The touch screen panel of claim 1, wherein the dummy member is formed of a same material in a same layer as the first sensing electrode.

3. The touch screen panel of claim 1, wherein the static electricity induction member extends from the second sensing electrode to the dummy member in an extending direction, wherein a width of the dummy member in a width direction different from the extending direction is greater than a width of the static electricity induction member in the width direction.

4. The touch screen panel of claim 3, further comprising:
   an insulating layer disposed between the portion of the static electricity induction member and the dummy member in a direction perpendicular to a touch surface of the screen panel, wherein a width of the insulating layer in the width direction is greater than the width of the static electricity induction member in the width direction.

5. The touch screen panel of claim 4, wherein the width of the insulating layer in the width direction is less than the width of the dummy member in the width direction.

6. The touch screen panel of claim 4, wherein a portion of the insulating layer is disposed between the second sensing electrode and the static electricity induction member.

7. The touch screen panel of claim 4, wherein a portion of the insulating layer is disposed between the second sensing electrode and the dummy member.

8. The touch screen panel of claim 4, further comprising: a protection layer overlapping the first sensing electrode, wherein the dummy member is disposed between a first portion of the insulating layer and a portion of the protection layer.

9. The touch screen panel of claim 8, wherein a portion of the insulating layer is disposed between the dummy member and the protection layer.

10. The touch screen panel of claim 8, wherein the portion of the protection layer is disposed between the dummy member and the first sensing electrode and directly contacts each of the dummy member and the first sensing electrode.

11. The touch screen panel of claim 1, wherein an edge of the dummy pattern is flush with an edge of the first sensing electrode.

12. The touch screen panel of claim 1, further comprising:
a first connection member; and
a third sensing electrode overlapping the first connection member in a direction perpendicular to a touch surface of the touch screen panel and being electrically connected to the first sensing electrode through the first connection member.

13. The touch screen panel of claim 12, further comprising: an insulating layer overlapping the first sensing electrode and having a contact hole structure, wherein the first connection member is electrically connected to the first sensing electrode through the contact hole structure.

14. The touch screen panel of claim 12, wherein the static electricity induction member is formed of a same material in a same layer as the first connection member.

15. The touch screen panel of claim 12, further comprising:
a second connection member; and
a fourth sensing electrode electrically connected to the second sensing electrode through the second connection member,
wherein the first sensing electrode, the second sensing electrode, and the second connection member are formed of a transparent electrode material, and
wherein the first connection member and the static electricity induction member are formed of an opaque metal material.

16. The touch screen panel of claim 15, wherein the second connection member is disposed between the first sensing electrode and the third sensing electrode.

17. The touch screen panel of claim 16, wherein the first sensing electrode and the second sensing electrode are disposed in a same layer, wherein a portion of the second sensing electrode is disposed between the first sensing electrode and the third sensing electrode, and wherein a portion of the first sensing electrode is disposed between the second sensing electrode and the fourth sensing electrode.

18. The touch screen panel of claim 12, further comprising:
a second dummy member disposed in a recess of the third sensing electrode and electrically insulated from the third sensing electrode; and
a second static electricity induction member electrically connected to the second sensing electrode, a portion of the second static electricity induction member overlapping the second dummy member in a direction perpendicular to a touch surface of the touch screen panel, being electrically insulated from the second dummy member, and being not electrically connected to the second dummy member.

19. The touch screen panel of claim 2, further comprising:
a first conductive line disposed in a sensing-electrode-free area that has no sensing electrodes, disposed between a first edge of the touch screen panel and the first sensing electrode in a plan view of the touch screen panel, and electrically connected to the first sensing electrode; and
a second conductive line disposed in the sensing-electrode-free area, disposed between a second edge of the touch screen panel and the second sensing electrode in the plan view of the touch screen panel, and electrically connected to the second sensing electrode,
wherein the first edge of the touch screen panel is substantially perpendicular to the second edge of the touch screen panel.

20. The touch screen panel of claim 1, wherein the first sensing electrode having a recess, and the dummy member disposed in the recess.

* * * * *